Nov. 4, 1958     T. F. THOMPSON     2,858,725
CONNECTING PIN HAVING DEPRESSIBLE ABUTMENT ELEMENT
Filed Dec. 24, 1954
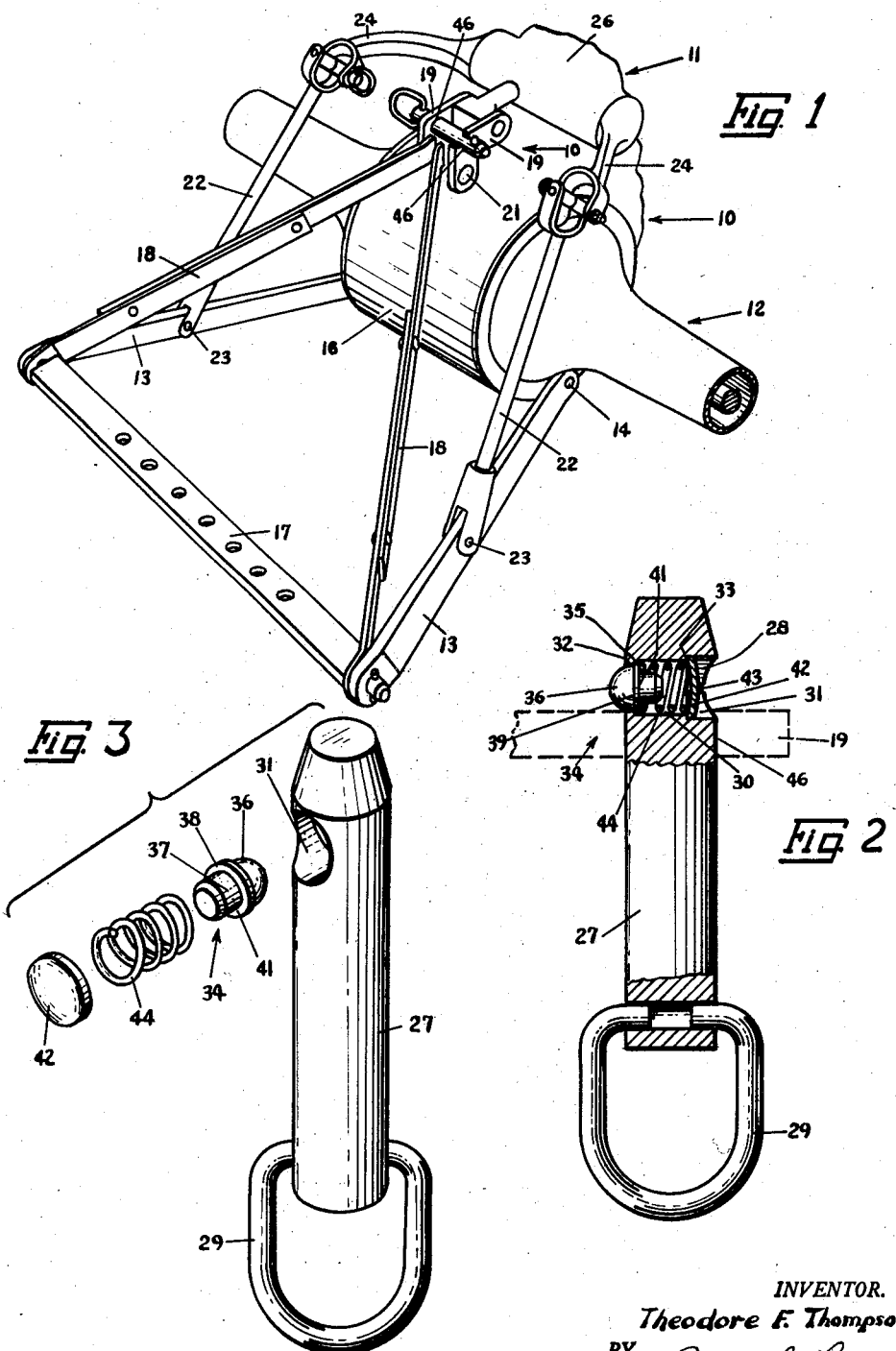
INVENTOR.
Theodore F. Thompson
BY
ATTY.

United States Patent Office 2,858,725
Patented Nov. 4, 1958

2,858,725

CONNECTING PIN HAVING DEPRESSIBLE ABUTMENT ELEMENT

Theodore F. Thompson, Des Moines, Iowa

Application December 24, 1954, Serial No. 477,452

1 Claim. (Cl. 85—5)

This invention relates generally to connecting units and more particularly to a connecting unit for releasably pivotally connecting separate structures.

An object of this invention is to provide an improved connecting unit for releasably pivotally connecting separate structures.

A further object of this invention is to provide a connecting unit which is of a unitary or self-contained construction to thereby dispense with the need for any separate cotter keys, nuts or the like.

Another object of this invention is to provide a connecting unit which is easily and quickly installed to pivotally connect separate structures, and which is readily removable to separate such structures when desired.

A further object of this invention is to provide a connecting unit which is adapted to pivotally interconnect a hydraulic power mechanism on a farm tractor with draw bar devices and the like.

Still another object of this invention is to provide a connecting unit having a cylindrical body member provided adjacent one end with a transversely movably pin member biased in one direction of movement so as to normally project outwardly from one side of such body member, with the pin member being of a construction and relatively assembled with the body member to provide a positive abutment against any force applied thereon in a direction longitudinally of the body member.

A further object of this invention is to provide a connecting unit which is of a compact and rugged construction, economical in manufacture, and efficient in operation to positively and easily connect and disconnect a pair of members.

Further objects, features and advantages of this invention will become apparent from the following description when taken in connection with the accompanying drawing in which:

Fig. 1 is a fragmentary perspective view showing a plurality of connecting units of this invention applied to a hydraulic power lift of a farm tractor, only the rear axle portion of which is illustrated;

Fig. 2 is an enlarged side elevational view of a connecting unit, shown generally in Fig. 1, with some parts broken away and other parts shown in section to more clearly illustrate its construction, and showing the unit in assembly relation with a part of the power lift which is connected to other parts by the unit; and Fig. 3 is an exploded perspective view of the connecting unit shown in Fig. 2.

With reference to the drawing, three connecting units of this invention, indicated generally at 10, are shown in Fig. 1 in assembly relation with the hydraulic power lift 11 of a farm tractor, only the rear axle assembly 12 of which is shown. The power lift 11 comprises a pair of rearwardly extended diverging arms 13 having their front ends pivoted at 14 to opposite sides of a differential housing 16 formed as part of the axle assembly 12. Connected between the rear ends of the arms 13, so as to be raised and lowered by the power lift 11, is a draw bar 17.

Pivotally supported at their rear ends on the draw bar 17, are a pair of upwardly and forwardly inclined brace bars 18, the forward or upper ends of which are pivotally connected by a connecting unit 10 to a pair of transversely spaced bell crank members 19 pivoted in turn, as at 21, to the top side of the differential housing 16. A pair of lift arms 22 have their lower ends pivotally connected at 23 to a corresponding one of the arm members 13, while the upper end of a lift arm 22 is operatively connected by a unit 10 with a crank arm 24 rotatably supported in a portion 26 of the differential housing 16. The crank arms 24 are operatively associated with a power mechanism (not shown), capable of raising and lowering the crank arms 24 to in turn provide for the raising and lowering of the lift arms 22.

Since the connecting units 10, shown generally in Fig. 1, are of a like construction, and similar in operation, only the unit 10 which connects the brace bars 18 and the bell crank members 19 will be described in detail.

A connecting unit 10 (Figs. 2 and 3) includes a cylindrical body member 27 having a transverse bore 28 adjacent one end thereof, and a grip ring 29 movably attached to the opposite end. The bore 28 has an intermediate section 30, an end section 31 of an enlarged diameter, and an opposite end section 32 of a reduced diameter relative to the intermediate section 30. The junctures of the section 30 and the sections 31 and 32 constitute annular stops or shoulders 33 and 35, respectively.

Supported for axial movement within the bore 28 is a pin 34 (Figs. 2 and 3) formed with a semi-spherical end or head portion 36, an opposite end or shank portion 37 of a cylindrical shape, and an annular projection or bearing portion 38 arranged between the end sections 36 and 37. The projection 38 is of a sufficiently narrow width and of a diameter sufficiently less than the diameter of the intermediate bore section 30 to provide for a limited canting or tilting of the projection 38 within the bore section 30. By virtue of the annular projection 38, the pin 34 is formed with stops or shoulders 39 and 41 on opposite sides of the projection 38.

To limit the tilting of the projection 38, the diagonal distance between opposed peripheral edges on the shoulders 39 and 41 respectively of the projection 38 is slightly greater than the diameter of the bore section 30. Thus, the projection 38 is permitted to tilt only an extent limited by the opposed peripheral edges both contacting the wall of the bore section 30, whereby the projection 38 acts as a wedge in the section 30 preventing further movement of the pin 34.

Additionally, the diameter of the semi-spherical head portion 36 is sufficiently less than the diameter of the intermediate bore section 32 whereby, upon the limited tilting of the projection 38 in the bore section 30, the periphery of the head portion 36 will not bind against the inner surface of the reduced bore section 32. Also, the longitudinal radial extent of the head portion 36 is sufficiently great that upon an initial tilting action of the pin 34, a portion of the head 36 stays protruded from the member 27 to prevent immediate and complete depression of the head 36 in the bore section 32.

Received within the bore section 31, to a stop position against the shoulder 33, is a concave disc or abutment member 42. The concave side of the disc 42 is initially positioned against the shoulder 33 after which the convex side of the disc 42 is struck to flatten the disc to an extent necessary to positively frictionally engage the disc with the wall of the bore section 31. As best appears in Fig. 2, the disc 42 is maintained within the bore section 31 by portions 43 of the body member 27 which are deformed into engagement with the outer side of the disc 42. A compression spring 44 positioned about the pin shank portion 37 and extended between the pin shoulder 41 and the inner side of the disc 42, biases the pin 34 to a position in which the pin shoulder 39 engages the stop 35 formed at the juncture of the bore sections 30 and 32.

It can thus be seen that the disc 42 operates to close one end of the bore 28 which thus functions, during use of the unit 10, as a cavity having an enlarged section 30 and a reduced section 32.

It is seen, therefore, that the disc 42 and the stop 35 constitute abutment members for maintaining the pin 34 within the bore 28 in the body member 27. The pressure of the spring 44 acts to hold the pin shoulder 39 against the stop 35 with the rounded pin portion 36 in a position projected transversely outwardly of the body member 27.

In the use of a connecting unit 10, assume that the unit 10 is in the position shown in Fig. 1, in which the body member 27 is extended through aligned openings 46 in the transversely spaced bell crank members 19 to pivotally connect the members 19 to the upper ends of the brace bars 18. The body member 27, which has a diameter only slightly less than the diameter of the openings 46, is positioned in the openings 46 and extended between the bell crank members 19, with the pin 34 and the ring 29 on the body member 27 being spaced apart a distance to provide for their being arranged outwardly of and adjacent to the members 19.

The projecting pin portion 36 and the ring 29 thus prevent any accidental movement of the unit 10 out of the openings 46 and thus constitute stop portions on the unit 10 for this purpose. Also, the unit 10 cannot be removed by a direct pull on the ring 29 in a direction longitudinally of the body member 27, since in response to such a pull the adjacent bell crank member 19 contacts the pin portion 36 and exerts a transverse force thereon which cants or tilts the annular projection 38 on the pin 34 into frictional engagement with the wall of the bore section 30.

Such frictional engagement prevents further inward movement of the pin portion 36 to thus prevent withdrawal of the body member 27 through the openings 46. Importantly, it is to be noted that by providing for a tilting action rather than having a constant abutting action of the peripheral surface of the head portion 36 with the side wall surface of the bore section 32, a frictional bearing action occurs therebetween, the obvious result of which is the prevention of undesirable wear at a circumferential point on the surface of the head portion 36. To permit such wearing action to continually occur would eventually destroy the semi-spherical surface of the portion 36, thus destroying its function and utility.

To remove a connecting unit 10 from a connecting relation with the bell crank members 19 and brace bars 18, the ring 29 is grasped and the body member 27 is concurrently pulled and rotated so that the moving forces exerted on the pin portion 36 by the adjacent bell crank member 19 act to move the pin portion 36 inwardly of the bore 28 against the pressure of the spring 44 to a position permitting withdrawal of the body member 27 through the adjacent opening 46. This action is effective to so move the pin portion 36 by virtue of the varying directions of the transverse forces exerted on the pin portion 36 by the bell crank member 19 in response to engagement of the member 19 with the pin portion 36. In other words, the pin 34 is continuously canted in different directions by virtue of such transverse forces exerted on the pin portion 36, with the pin 34 moving inwardly of the bore 28 each time the direction of canting is varied.

It is apparent that this action of concurrent canting or tilting and inward movement of the pin 34 occurs simultaneously and smoothly so that the pin 34 is moved inwardly in one continuous motion. In other words, since the direction of the forces applied on the pin portion 36 is continuously changing the pin projection 38 is never tilted sufficiently to bind the projection 38 on the bore section 30. As a result, on concurrent rotating and pulling of the body member 27, the unit 10 is readily detached from the bell crank members 19, and brace bars 18.

To insert the unit 10 in an opening 46, the tapered end portion 51 of the body member 27 is initially inserted in the opening 46 so that the projecting pin portion 36 is moved into engagement with the bell crank member 19. The unit 10 is then manipulated so that the body member 27 is concurrently pushed and rotated to thereby depress the pin 34 and move the pin 34 and the body member 27 through the opening 46 in the same manner that the unit 10 is detached from the bell crank members 19. It is apparent that the connecting units 10 are assembled with and removed from the crank arms 24 and lift arms 22 in the same manner.

From the above description, it is seen that this invention provides a connecting unit 10 which is operable to pivotally connect any members which it is desired to so connect. The unit 10 is readily operated with one hand so that by merely moving the unit 10 longitudinally concurrently with rotating the unit 10 operates to readily assemble the unit 10 with the desired parts to be interconnected. The pin 34 and the ring 29 constitute stop members on the body member 27 for preventing any accidental removal of the unit 10 from a connecting position, with the pin 34 being movable transversely of the body member 27 to provide for such removal only on a predetermined manual movement of the connecting unit 10.

Although the invention has been described with respect to a preferred embodiment thereof, it is to be understood that it is not to be so limited, since changes can be made therein which are within the full intended scope of this invention as defined by the appended claim.

I claim:

A connecting unit comprising an elongated cylindrical body member having a transversely extended cavity formed therein, with said cavity having a reduced section at one end thereof to form an annular shoulder therebetween, said shoulder extended in a plane normal to the longitudinal axes of said cavity and said section, and a depressible abutment pin in said cavity biased toward said reduced section, said pin having an annular bearing projection in contacting engagement with said shoulder, said bearing projection having a peripheral surface of a narrow width whereby said surface extends parallel to and is spaced slightly from the wall of said cavity, the distance between diagonally opposed peripheral edge portions of said bearing projection being only slightly greater than the diameter of said cavity to permit a slight tilting of said bearing projection prior to a wedging contact by said edge portions with said cavity wall, a head portion extended from one side of said bearing projection through said reduced section and having a semi-spherical portion protruded beyond said body member, the diameter of said head portion being sufficiently less than the inner diameter of said reduced section to allow a relative movement therebetween upon tilting of said bearing projection, the longitudinal radial extent of said head portion being such that upon initial contact of said edge portions with said cavity wall due to the application of a tangential force against said semi-spherical portion, said semi-spherical portion remains protruded beyond said body member thereof though to a lesser extent than prior to the application of said tangential force.

References Cited in the file of this patent

UNITED STATES PATENTS

| 1,422,067 | Abegg | July 11, 1922 |
| 2,612,377 | Edens | Sept. 30, 1952 |

FOREIGN PATENTS

| 362,166 | Great Britain | Dec. 3, 1931 |
| 152,318 | Switzerland | Apr. 1, 1932 |

OTHER REFERENCES

Pin Pin Bulletin #S-1008-V, September 1952, Aviation Developments Inc., Burbank, California.